United States Patent [19]
Baer et al.

[11] 3,726,372
[45] Apr. 10, 1973

[54] HELICAL SPRING CLUTCH

[75] Inventors: John S. Baer, Medford Lakes; John H. Weatherby, Sewell, both of N.J.

[73] Assignee: Warner Electric Brake & Clutch Company, South Beloit, Ill.

[22] Filed: Oct. 27, 1971

[21] Appl. No.: 193,057

[52] U.S. Cl. ............... 192/26, 192/33 C, 192/81 C
[51] Int. Cl. ................................................ F16d 11/06
[58] Field of Search ................ 192/26, 81 C, 33 C, 192/415

[56] References Cited

UNITED STATES PATENTS

| | | |
|---|---|---|
| R25,229 | 8/1962 | Sacchini et al. ................. 192/26 |
| 3,128,863 | 4/1964 | Tomko ............................ 192/81 C |
| 3,528,533 | 9/1970 | Sacchini ......................... 192/81 C |
| 3,185,276 | 5/1965 | Sajovec, Jr. .................... 192/81 C |

Primary Examiner—Charles J. Myhre
Assistant Examiner—Randall Heald
Attorney—Wolfe, Hubbard, Leydig, Voit & Osann

[57] ABSTRACT

A normally engaged helical spring clutch in which selected turns of the spring are telescoped with a differential fit over the input and output hubs to insure torsional loading of the spring as an incident to disengagement of the clutch.

16 Claims, 11 Drawing Figures

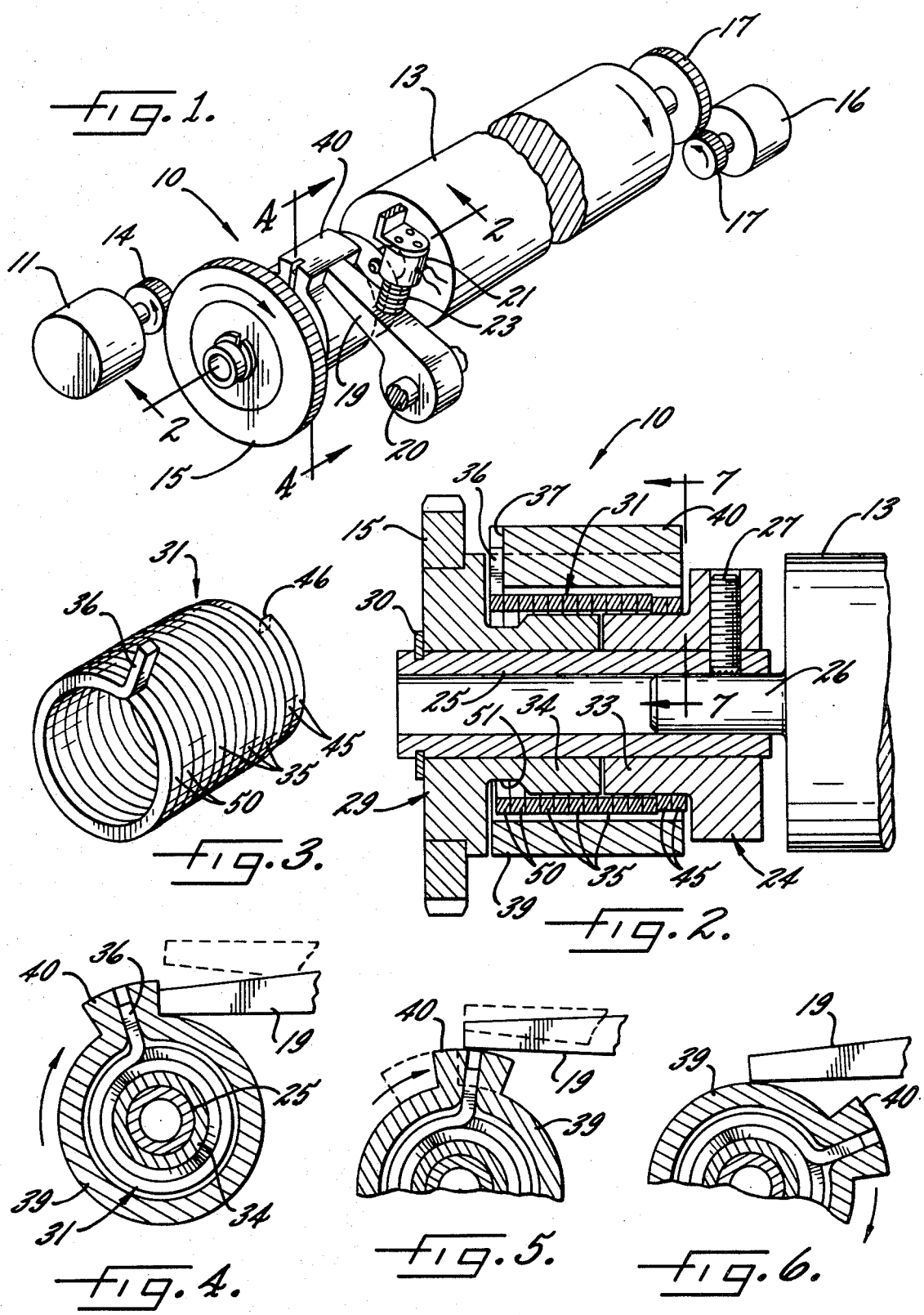

3,726,372

HELICAL SPRING CLUTCH

BACKGROUND OF THE INVENTION

This invention relates to a clutch of the type having a coiled helical spring which normally is contracted around two coaxial members to couple the members for rotation in unison but which may be selectively unwound and expanded to permit relative rotation between the members. The invention has more specific reference to a clutch in which a control collar is telescoped over the members and is anchored to one end of the spring, the collar normally being rotatable in unison with the members and being operable when held by a stop to cause unwinding and expansion of the spring in response to continued rotation of either of the members. As an incident to such unwinding, it is desirable to torsionally load the spring so that, when the stop is subsequently released to free the collar for movement from its stopped position, the collar will automatically snap forwardly to move past the stop and into a position allowing the spring to re-couple the members.

SUMMARY OF THE INVENTION

The primary aim of the present invention is to provide a new and improved clutch of the above character which insures that the spring will be torsionally loaded upon unwinding of the spring and will remain torsionally loaded until the control collar is released in spite of the natural tendency of the spring to unload itself and in spite of such factors as vibrations, temperature changes and the like which tend to cause unloading of the spring.

A further object is to provide a clutch in which torsional loading of the spring normally is effected by relative rotation of one of the members but can be effected by relative rotation of the other member if relative rotation is not imparted to the first member, the spring being telescoped over the members with a differential fit to insure loading of the spring and retention of the loading regardless of which member is rotated to produce the loading.

In a more detailed sense, the invention resides in the novel sizing of the spring and the rotatable members to cause selected different turns of the spring to grip the members with different degrees of tightness so as to releasably couple the members while insuring torsional loading of the spring.

One embodiment of the invention also is characterized by the novel interfitting of the spring with one of the members to prevent the spring from creeping axially along the members.

These and other objects and advantages of the invention will become more apparent from the following detailed description when taken in conjunction with the accompanying drawings.

BRIEF DESCRIPTION OF THE DRAWINGS

FIG. 1 is a perspective view schematically showing an exemplary drive system equipped with one embodiment of a new and improved clutch incorporating the novel features of the present invention.

FIG. 2 is an enlarged fragmentary cross-section taken substantially along the line 2—2 of FIG. 1.

FIG. 3 is a perspective view of the helical spring used in the clutch.

FIG. 4 is an enlarged fragmentary cross-section taken substantially along the line 4—4 of FIG. 1.

FIGS. 5 and 6 are views similar to FIG. 4 but showing the parts in successively moved positions.

DETAILED DESCRIPTION OF THE PREFERRED EMBODIMENTS

Figure 7:
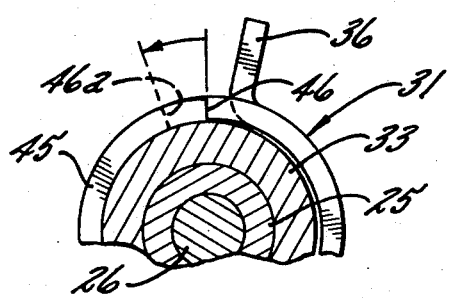
FIG. 7 is a fragmentary cross-section taken substantially along the line 7—7 of FIG. 3 and showing part of the spring on an exaggerated scale.
Figure 8:
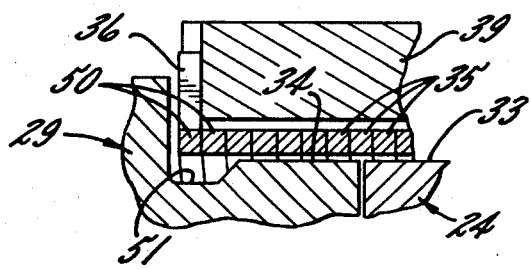
FIG. 8 is a fragmentary view similar to FIG. 2 but on an exaggerated scale and showing the clutch disengaged.

As shown in the drawings for purposes of illustration, the invention is embodied in a clutch 10 for coupling a driving element 11 and a driven element 13 for rotation in unison and selectively operable to uncouple the elements to allow rotation of either relative to the other. While the clutch will find numerous applications in widely varying environments, it is shown schematically in the drawings as being incorporated in the paper feed system of a copying machine. In such an instance, the driving element 11 is a small motor and the driven element 13 is an elongated roller which coacts with a companion roller (not shown) to feed the paper.

The motor 11 is connected by way of gears 14 and 15 to the input of the clutch 10 whose output, in turn, is connected to one end of the roller 13. A second motor 16 is connected by gears 17 to the opposite end of the roller and is operable to rotate the roller in the same direction as the motor 11. Incorporated in the copying machine and associated with the clutch is a stop or so-called interposer 19 which effects disengagement of the clutch to enable relative rotation between the motor 11 and the roller 13. The interposer comprises an arm which is pivoted about a horizontal axis at 20 to swing upwardly and downwardly between an inactive position enabling engagement of the clutch and an active position effecting disengagement of the clutch. Energization of a solenoid 21 (FIG. 1) serves to swing the interposer upwardly to its inactive position while a compression spring 23 urges the interposer downwardly toward its active position when the solenoid is de-energized.

Prior to an exemplary operating cycle, the interposer 19 is located in a position enabling engagement of the clutch 10. A cycle is initiated by energizing the motor 11 which immediately rotates the roller 13 clockwise (FIG. 1) via the clutch thereby to feed the paper. In response to initial rotation of the roller, the interposer shifts downwardly to its active position and acts to disengage the clutch after the roller has completed one revolution. The motor 11 and the roller thus are free to rotate relative to one another and, after overrunning a very short distance, the motor is de-energized. Shortly after disengagement of the clutch, the motor 16 is energized to drive the roller further in a clockwise direction and effect so-called paper run out. Upon completion of the run out, the motor 16 is de-energized and, shortly thereafter, the solenoid 21 is pulsed momentarily to retract the interposer to its inactive position and enable re-engagement of the clutch preparatory to another operating cycle. In certain instances such as when the paper supply may be exhausted, the run out motor 16 is not energized to drive the roller and no run out occurs. In all cases, however, the solenoid 21 is pulsed at the proper time to retract the interposer preparatory to the next cycle.

The clutch 10 is shown in detail in FIG. 2 and includes an output member 24 which is telescoped over and connected rigidly to one end portion of a central sleeve 25. A trunnion 26 on the end of the roller 13 is telescoped into the sleeve and is anchored for rotation with the latter by a set screw 27 threaded into the output member and the sleeve. Telescoped rotatably over the opposite end portion of the sleeve is an input member 29 to which the driving gear 15 is press-fitted, a snap ring 30 on the end of the sleeve preventing movement of the input member along the sleeve. Thus, the feed motor 11 rotates the input member 29 on the sleeve 25 via the gear 15 and, when the input member is coupled to the output member 24, the latter rotates the sleeve to turn the roller 13. When the input and output members are uncoupled, the input member may rotate freely on the sleeve during overrun of the feed motor 11 and the output member and the sleeve may rotate freely relative to the input member as the roller is driven by the motor 16 during run out.

To releasably couple the output and input members 24 and 29, a coiled helical spring 31 is telescoped over reduced diameter hubs 33 and 34 (FIG. 2) formed at the inner end portions of the output and input members, respectively, and disposed end-to-end with one another, the hubs being of circular cross-section and each having the same major diameter. Between its ends, the spring includes a large number of intermediate turns or coils 35 (FIG. 3) wound on a left hand helix and with a relaxed inner diameter which is less than the diameter of the hubs. Accordingly, when the spring is telescoped over the hubs, the intermediate coils 35 expand to receive the hubs and then resiliently contract around and hug the hubs.

Formed on that end of the spring 31 located adjacent the outer end of the input tub 34 is a radially projecting tang 36 (FIG. 3) which is fitted snugly into a radially extending slot 37 (FIG. 2) formed in the end of an annular control collar 39 telescoped loosely over the spring. The slot extends radially along and is centered relative to a comparatively narrow lug 40 formed integrally with and projecting radially from the control collar and adapted to engage and coact with the interposer 19 to cause disengagement of the clutch 10.

When the various parts are at rest prior to the beginning of a cycle, the solenoid 21 is in a de-energized condition and the compression spring 23 presses the interposer 19 downwardly against the upper surface of the stop lug 40 as shown in FIG. 5, the leading face of the lug being located just ahead of the interposer. In this condition, the helical spring 31 is contracted around the hubs 33 and 34 and frictionally couples the hubs for rotation in unison. Thus, when the feed motor 11 is energized to turn the input hub 34, the spring turns the output hub 33 and causes turning of the roller 13. As an incident to turning, the input hub exerts clockwise (FIGS. 1 and 3) torque on the coils 35 and tends to wind and contract the coils so that the spring grips the hubs even more tightly to insure against slippage.

Because the leading face of the stop lug 40 initially is located past the interposer 19 (see FIG. 5), the collar 39 is free to turn and thus, when the spring 31 is first turned, the tang 36 rotates the collar in unison with the hubs 33 and 34. The lug 40 thus turns past the interposer to enable the latter to swing downwardly to its active position (FIG. 6) against the outer annular surface of the collar. As the collar completes one revolution, the leading face of the lug rotates into engagement with the interposer to stop further rotation of the collar and the tang (see FIG. 4). The input hub 34, however, continues to rotate during overrun of the feed motor 11 and, as an incident to such rotation, continues to exert clockwise torque on the spring. Because the stopped tang prevents turning of the input end of the spring, such torque tends to unwind and radially expand the coils 35 to release the coils from tight gripping engagement with the hubs and thereby enable the input hub to free-wheel relative to the output hub as the feed motor 11 overruns before coming to a stop. By the same token, clockwise turning (FIGS. 1 and 3) of the output hub 33 by the motor 16 during the subsequent paper run out exerts torque in the same direction on the spring and, with the tang 36 stopped, the coils 35 unwind and expand to allow rotation of the output hub relative to the stopped input hub 34 until the run out motor is de-energized. At the end of the cycle, the solenoid 21 is pulsed momentarily to retract the interposer 19 from its active position (FIG. 4) in front of the lug 40 to its inactive position (shown in phantom in FIGS. 4 and 5) spaced upwardly from the lug preparatory to re-engagement of the clutch for another feed cycle.

In accordance with the present invention, selected turns or coils of the spring 31 are fitted extra tight around the output hub 33, the extra tight coils in the embodiment shown in FIGS. 1 to 9 being at least one and preferably two coils 45 at the output end of the spring. When the output hub is turned relative to the input hub 34 during run out, the extra tight end coils 45 remain positively gripped to and turn physically with the output hub through a short distance after stopping of the tang 36 thereby to torsionally load the spring. The torsional load placed in the spring is exerted through the tang onto the collar 39 and biases the the collar clockwise (FIG. 4) to enable the lug 40 to snap forwardly to a position beneath the interposer 19 when the latter is retracted momentarily following completion of the run out. As a result of the collar snapping forwardly, the spring relaxes and contracts to re-couple the hubs for the next cycle and, at the same time, the leading face of the lug 40 moves past interposer to the position shown in FIG. 5 so that the interposer will not block the leading face upon being returned downwardly when the solenoid 21 is de-energized but instead will press idly against the top of the lug (see FIG. 5) to enable immediate turning of the output hub 33 when the feed motor 11 is again energized. In addition to insuring torsional loading of the spring 31 during run out, the grip effected by the extra tight coils 45 on the output hub 33 prevents the output end of the spring from creeping reversely or counterclockwise (FIG. 3) on the hub after the latter has stopped and thereby maintains the loading on the spring until the interposer is retracted.

While the extra tight grip of the end coils 45 could be effected by enlarging that particular section of the output hub 33 which telescopes into the end coils, the tight fit is achieved herein by forming the spring such that the relaxed inner diameter of the end coils is somewhat less (e.g., 0.004 to .006 inch) than the relaxed inner diameter of the intermediate coils 35 (see FIG. 3). Thus, when the spring is telescoped over the hubs 33 and 34, the end coils 45 grip the outermost section of the output hub 33 somewhat tighter than the larger intermediate coils 35 grip the inner sections of the two hubs.

When the lug 40 first engages the interposer 19 upon completing one revolution, the extreme output end 46 of the spring (i.e., the end opposite the tang 36) is positioned angularly relative to the tang as shown in full lines in FIG. 7. After the tang has been stopped and as the output hub 33 continues to rotate during run out, the intermediate coils 35 expand to uncouple the hubs 33 and 34 but the extra tight end coils 45 continue to grip the output hub so as to cause the end 46 to turn with the hub and relative to the tang through a short distance in a counterclockwise direction as viewed in FIG. 7 to the position 46a shown in phantom and thereby torsionally load the spring. The end 46 then slips relative to the output hub as the run out is completed but the frictional drag between the hub and the extra tight end turns 45 keeps the end 46 in the phantom position to maintain the loading on the spring. After the output hub has stopped, the extra tight coils hold the end 46 in the phantom position and prevent the end from creeping reversely (or clockwise as viewed in FIG. 7) to its relaxed position shown in full in spite of the natural tendency of the spring 31 to unload itself and in spite of vibrations, slight thermal expansion of the spring, and other factors which might otherwise cause or permit creeping of the spring. Accordingly, the spring is torsionally loaded during run out and is positively maintained in a loaded condition by the extra tight coils 45 so as to snap the lug 39 forwardly past the interposer 19 when the latter is momentarily retracted.

During those cycles when paper run out does not take place, the output hub 33 stops essentially at the same time that the lug 40 hits the interposer 19 and does not continue forwardly to torsionally load the spring 31. Advantageously, the input end portion of the spring 31 is fitted over the input hub 34 in such a manner as to load the spring in response to overrun of the input hub when run out does not occur at the output hub. This is achieved by making two turns or coils 50 (FIG. 3) at the input end of the spring telescope over the outer section of the input hub 34 with a looser fit than is established between the two hubs and the intermediate coils 35.

The loose fit between the two end coils 50 and the outer end section of the input hub 34 could be effected by forming the end coils with a relaxed inner diameter which is somewhat larger than the diameter of the intermediate coils 35. In the present instance, however, the loose fit is achieved by making the end coils 50 on the same diameter as the intermediate coils 35 and by reducing the diameter of the hub section which telescopes into the end coils, the reduction in diameter being effected by forming an annular undercut 51 in the outer end section of the input hub as shown on an exaggerated scale in FIGS. 8 and 9.

Figure 9:
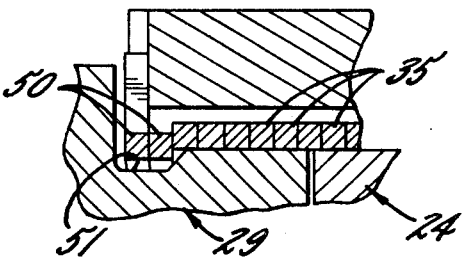
FIG. 9 is a view similar to FIG. 8 but showing the clutch engaged.

When the hubs 33 and 34 are coupled, the end coils 50 are contracted into the undercut 51 as shown in FIG. 9 and embrace the input hub 34 with less gripping force than that imposed on the two hubs by the intermediate coils 35. The end coils 50 are more relaxed than the intermediate coils 35 and, when the lug 39 first engages the interposer 19, the end coils unwind and expand radially outwardly (see FIG. 8) before any expansion of the intermediate coils takes place during overrun of the input hub. The differential expansion occurring between the end coils 50 and the intermediate coils 35 as an incident to the overrun loads the spring 31 torsionally and, upon subsequent retraction of the interposer 19, the end coils contract back into the undercut 51 and snap the lug 40 forwardly. The lug thus clears the interposer to enable driving of the roller 13 during the next cycle even though no run out occurred in the previous cycle to load the spring. During loading of the spring by the overrun, the extra tight end coils 45 continue to grip the output hub 33 to help insure retention of the loading after completion of the overrun and stopping of the input hub 34.

From the foregoing, it will be apparent that the present invention brings to the art a new and improved clutch 10 in which the differential fit between the hubs 33 and 34 and the various coils of the spring 31 effects positive torsional loading of the spring. The clutch thus is more reliable and trouble-free in service use than prior clutches of the same general type.

Figure 10:
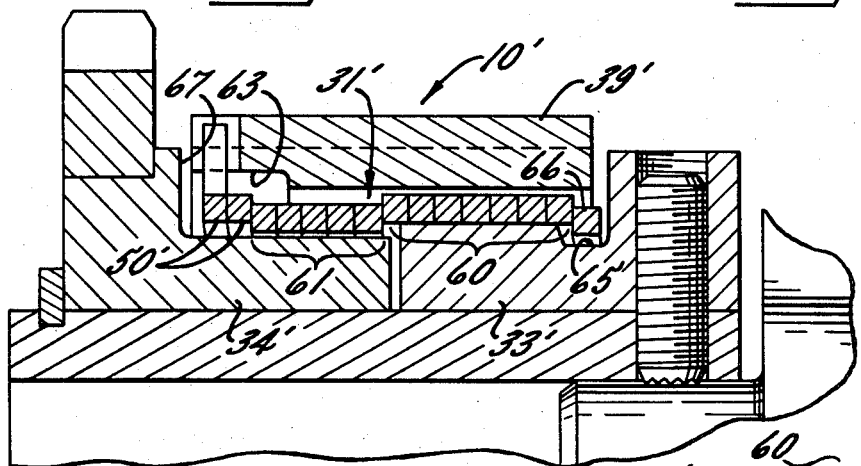
FIG. 10 is a view similar to FIG. 2 but shows another embodiment of a clutch incorporating the novel features of the invention.
Figure 11:
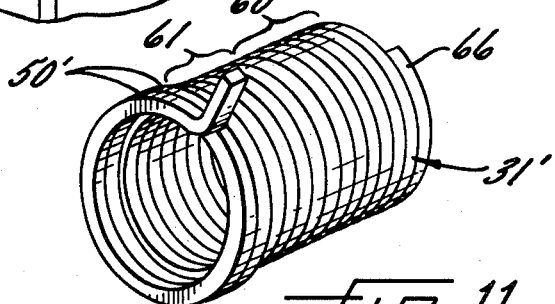
FIG. 11 is a perspective view of the spring used in the clutch shown in FIG. 10.

A second embodiment of a clutch incorporating the novel features of the invention is shown in FIGS. 10 and 11 in which parts corresponding to those of the first embodiment are indicated by the same but primed reference numerals. The clutch 10' of the second embodiment is characterized by its ability to keep the spring 31' from slipping or "walking" axially along the hubs 33' and 34' and causing binding of the collar 39'.

As shown in FIG. 10, the extra tight fit of the spring 31' on the output hub 33' is effected in this instance by making a group 60 of intermediate coils grip the output hub with a greater degree of tightness than another group 61 of intermediate coils grip the input hub 34'. The differential grip could be achieved by making both hubs of the same diameter as before and by forming the group 60 of coils with a smaller inner diameter than the group 61. It is preferred, however, to make both groups 60 and 61 of intermediate coils of the same diameter and to make the major diameter of the output hub 33' larger than the major diameter of the input hub 34' as shown in FIG. 10. The coils 60 thus grip the output hub 33' extra tight and serve generally the same purpose as the end coils 45 of the first embodiment while effecting a tight grip over a greater length of the hub.

Herein, the extra loose fit between the input hub 34' and the input end of the spring 33' is effected by making two end coils 50' of larger diameter than the intermediate coils 60 and 61 (see FIG. 11). The input hub 34' is of constant diameter throughout its length and thus is gripped more loosely by the enlarged end coils 50' than by the intermediate coils 61. As a result, the end coils 50' expand further outwardly than the intermediate coils 61' when the input hub overruns after stopping of the collar 39'. In order to accommodate radial expansion of the end coils 50', the input end of the collar 39' is counterbored to define a clearance groove 63 (FIG. 10) surrounding the end coils.

Endwise sliding or walking of the spring 31' on the hubs 33' and 34' is prevented by undercutting the outboard end portion of the output hub so as to form a groove 65 (FIG. 10) of reduced diameter around the hub. The groove underlies the end coil 66 at the output end of the spring 31' and such end coil is formed on the same diameter as the intermediate coils 60. Accordingly, the end coil 66 seats in the groove 65 and is engageable with the inboard wall thereof to prevent the spring from walking or creeping axially from the output hub 33' toward the input hub and thereby reduce the danger of the spring binding axially between the output hub and the inner face 67 of the input hub 34' upon application of a reverse output torque, such binding otherwise preventing forward motion of the collar 39' when the interposer is retracted momentarily.

We claim as our invention:

1. A clutch having first and second coaxial members disposed end-to-end, a coiled helical spring having a number of intermediate turns telescoped over both of said members with substantially the same predetermined degree of tightness and normally contracted around the members to couple the latter together for rotation in unison in one direction, a control collar telescoped loosely over said spring and anchored to a first end of the spring located adjacent said first member, said collar normally being rotatable in unison with said members and being operable when stopped in a given angular position to cause unwinding and expansion of said spring in response to continued rotation of either of said members thereby to enable relative rotation between the members, the second end of the spring located adjacent said second member being free of a positive connection with said collar and with said second member thereby to slip on and permit rotation of said second member after stopping of said collar, said spring having a first end turn telescoped over said first member with a lesser degree of tightness than said predetermined degree to cause such turn to expand radially outwardly through a greater distance than said intermediate turns during unwinding of said spring by relative rotation of said first member thereby to torsionally load the spring and bias said collar to turn in said one direction beyond said stopped position, and said spring having a second and opposite end turn telescoped over said second member with a greater degree of tightness than said predetermined degree to insure continued contraction of such turn around said second member when said spring is unwound thereby to enable torsional loading of said spring during unwinding of the spring by rotation of said first member and to torsionally load the spring and bias said collar to turn in said one direction beyond said stopped position during unwinding of said spring by relative rotation of said second member.

2. A clutch as defined in claim 1 in which said members are of circular cross-section and in which the sections of said members telescoped into said intermediate turns have substantially the same predetermined diameter, said intermediate turns and one of said end turns all having substantially the same relaxed inner diameter which is smaller than said predetermined diameter, and the section of the member telescoped into said one end turn having a diameter different than said predetermined diameter.

3. A clutch as defined in claim 1 in which said members are of circular cross-section and in which the sections of said members telescoped into said intermediate turns and into one of said end turns all have substantially the same predetermined diameter, said intermediate turns having a relaxed inner diameter smaller than said predetermined diameter and said one end turn having a relaxed inner diameter different than the relaxed inner diameter of said intermediate turns.

4. A clutch as defined in claim 1 in which said members are of circular cross-section and in which the sections of said members telescoped into said intermediate turns and into one of said end turns all have substantially the same predetermined diameter, said intermediate turns having a relaxed inner diameter smaller than said predetermined diameter and said one end turn having a relaxed inner diameter different than the relaxed inner diameter of said intermediate turns, the other of said end turns having a relaxed inner diameter which is substantially the same as the relaxed inner diameter of said intermediate turns, and the section of the member telescoped into said other end turn having a diameter different than said predetermined diameter.

5. A clutch as defined in claim 1 in which said members are of circular cross-section and in which the sections of said members telescoped into said intermediate turns have substantially the same predetermined diameter, said intermediate turns having a relaxed inner diameter smaller than said predetermined diameter so as to telescope over said members with said predetermined degree of tightness, said first end turn having a relaxed inner diameter which is substantially the same as the relaxed inner diameter of said intermediate turns, and the section of the first member telescoped into said first end turn having a diameter less than said predetermined diameter so as to fit into such turn with a lesser degree of tightness.

6. A clutch as defined in claim 1 in which said members are of circular cross-section and in which the sections of said members telescoped into the intermediate turns and the section of said second member telescoped into said second end turn all have substantially the same predetermined diameter, said intermediate turns having a relaxed inner diameter smaller than said predetermined diameter so as to telescope over said members with said predetermined degree of tightness, and said second end turn having a relaxed inner diameter smaller than the relaxed inner diameter of said intermediate turns so as to telescope over said second member with a greater degree of tightness.

7. A clutch as defined in claim 1 in which said members are of circular cross-section, the sections of said members telescoped into said intermediate turns and the section of said second member telescoped into said second end turn all having substantially the same predetermined diameter, said intermediate turns having a relaxed inner diameter less than said predetermined diameter so as to telescope over said members with said predetermined degree of tightness, said second end turn having a relaxed inner diameter less than the relaxed inner diameter of said intermediate turns so as to telescope over said second member with said greater degree of tightness, said first end turn having a relaxed inner diameter which is substantially the same as the relaxed inner diameter of said intermediate turns, and the section of said first member telescoped into said first end turn having a diameter less than said predetermined diameter so as to fit into such turn with said lesser degree of tightness.

8. A clutch having first and second coaxial members disposed end-to-end, a coiled helical spring extending around said members and normally contracted on the members to couple the latter for rotation in unison in one direction, a control collar telescoped loosely over said spring and anchored to a first end of the spring located adjacent said first member, said collar normally being rotatable in unison with said members and being operable when stopped in a given angular position to cause unwinding and expansion of said spring in response to continued rotation of either of said members thereby to enable relative rotation between the members, the second end of the spring located adjacent said second member being free of a positive connection with said collar and with said second member thereby to slip angularly on and permit rotation of said second member after stopping of said collar, said spring having a first group of intermediate turns telescoped over said first member with a predetermined degree of tightness, said spring having a second group of intermediate turns telescoped over said second member with a greater degree of tightness than said predetermined degree to insure continued contraction of the latter turns around said second member when said spring is unwound thereby to torsionally load the spring and bias said collar to turn in said one direction beyond said stopped position during unwinding of said spring by relative rotation of said second member, and said spring having a first end turn located adjacent the outboard end portion of said first member and telescoped over said first member with a lesser degree of tightness than said predetermined degree to cause said first end turn to expand radially outwardly through a greater degree than said intermediate turns during unwinding of the spring by relative rotation of said first member thereby to torsionally load the spring and bias said collar to turn in said one direction beyond said stopped position.

9. A clutch as defined in claim 8 in which said spring includes a second end turn located adjacent the outboard end portion of said second member, and a groove formed around the outboard end portion of said second member and receiving said second end turn when said spring is unwound thereby to prevent the spring from slipping axially on said members from said second member toward said first member.

10. A clutch as defined in claim 9 in which said members are of circular cross-section and in which said second end turn and all of said intermediate turns have substantially the same relaxed inner diameter, the diameter of the section of the first member telescoped into the first group of intermediate turns being less than the diameter of the section of the second member telescoped into said second group of intermediate turns, and the relaxed inner diameter of said first end turn being larger than the relaxed inner diameter of said intermediate turns and said second end turn.

11. A clutch as defined in claim 10 in which a groove is formed around the inner wall of said collar and extends around said first end turn to accommodate radial expansion of the latter.

12. A clutch having first and second coaxial members disposed end-to-end, a coiled helical spring having a plurality of intermediate turns extending around and telescoped over said members and operable when contracted around the members to couple the latter together for rotation in unison in one direction, a control collar telescoped loosely over said spring and anchored to a first end of the spring located adjacent said first member, said collar normally being rotatable in unison with said members and being operable when stopped in a given angular position to cause unwinding and expansion of said spring in response to continued rotation of either of said members thereby to enable relative rotation between the members, the second end of the spring located adjacent said second member being free of a positive connection with said collar and with said second member thereby to slip angularly on and permit rotation of said second member after stopping of said collar, a number of the intermediate turns extending around said first member being telescoped over the latter with a predetermined degree of tightness, said spring having a first end turn telescoped over said first member with a lesser degree of tightness than said predetermined degree to cause such turn to expand radially outwardly through a greater distance than said intermediate turns during unwinding of said spring by relative rotation of said first member thereby to torsionally load the spring and bias said collar to turn in said one direction beyond said stopped position, and said spring having at least one turn telescoped over said second member with a greater degree of tightness than said predetermined degree to insure continued contraction of such turn around said second member when said spring is unwound thereby to torsionally load the spring and bias said collar to turn in said one direction beyond said stopped position during unwinding of said spring by relative rotation of said second member.

13. A clutch having first and second coaxial members disposed end-to-end, a coiled helical spring having a plurality of intermediate turns telescoped over and extending around said members and normally contracted on the members to couple the latter together for rotation in unison in one direction, a number of the intermediate turns extending around said first member being telescoped over the latter with a predetermined degree of tightness, a control collar telescoped loosely over said spring and anchored to a first end of the spring located adjacent said said first member, said collar normally being rotatable in unison with said members and being operable when stopped in a given angular position to cause unwinding and expansion of said spring in response to continued rotation of either of said members thereby to enable relative rotation between the members, the second end of the spring located adjacent said second member being free of a positive connection with said collar and with said second member thereby to slip angularly on and permit rotation of said second member after stopping of said collar, said spring having a first end turn telescoped over said first member with a lesser degree of tightness than said predetermined degree to cause such turn to expand radially outwardly through a greater distance than said intermediate turns during unwinding of said spring by relative rotation of said first member thereby to torsionally load the spring and bias said collar to turn in said one direction beyond said stopped position, and said spring having at least one turn telescoped over said second member with a greater degree of tightness than said predetermined degree to insure continued contraction of such turn around said second member when said spring is unwound thereby to enable torsional loading of said spring during unwinding of the spring by rotation of said first member and to torsionally load the spring and bias said collar to turn in said one direction beyond said stopped position during unwinding of said spring by relative rotation of said second member.

14. A clutch as defined in claim 13 in which said turn which is telescoped over said second member with said greater degree of tightness is a second end turn located adjacent the second end of the spring, said members being of circular cross-section, the sections of said members telescoped into said intermediate turns and the section of said second member telescoped into said second end turn all having substantially the same predetermined diameter, said intermediate turns all having a relaxed inner diameter less than said predetermined diameter so that all of said intermediate turns telescope over said members with said predetermined degree of tightness, said second end turn having a relaxed inner diameter less than the relaxed inner diameter of said intermediate turns so as to telescope over said second member with said greater degree of tightness, said first end turn having a relaxed inner diameter which is substantially the same as the relaxed inner diameter of said intermediate turns, and the section of said first member telescoped into said first end turn having a diameter less than said predetermined diameter so as to fit into such turn with said lesser degree of tightness.

15. A clutch as defined in claim 13 in which said turn which is telescoped over said second member with said greater degree of tightness is an intermediate turn, all of the intermediate turns extending around said second member being telescoped over the latter with said greater degree of tightness, and said spring having a second end turn located adjacent the second end of the spring and telescoped over said second member with a lesser degree of tightness than said predetermined degree.

16. A clutch as defined in claim 15 in which said members are of circular cross-section and in which all of said intermediate turns have substantially the same relaxed inner diameter, the diameter of the section of the second member telescoped into said intermediate turns being greater than the diameter of the section of the first member telescoped into said intermediate turns.

* * * * *